United States Patent [19]

Levosinski et al.

[11] Patent Number: 5,248,162
[45] Date of Patent: Sep. 28, 1993

[54] AIR BAG INFLATOR HAVING HELICAL GAS FLOOR SPACE

[75] Inventors: George J. Levosinski, Marine City; Edward J. Corrion, Armada; William P. Braun, Romeo; Clarence R. Husband; John P. Wallner, both of Rochester Hills, all of Mich.

[73] Assignee: TRW Vehicle Safety Systems Inc., Lyndhurst, Ohio

[21] Appl. No.: 794,986

[22] Filed: Nov. 19, 1991

[51] Int. Cl.$^5$ .............................................. B60R 21/26
[52] U.S. Cl. ...................................... 280/740; 55/498
[58] Field of Search .................... 55/498, 486, 359; 210/483, 484, 489; 222/3; 280/736, 738, 740, 741, 742, 737; 422/164

[56] References Cited

U.S. PATENT DOCUMENTS

| | | | |
|---|---|---|---|
| 3,931,019 | 1/1976 | Fowler | 210/489 |
| 4,652,285 | 3/1987 | Greene | 55/498 |
| 4,817,828 | 4/1989 | Goetz | 280/736 X |
| 4,846,368 | 7/1989 | Goetz | 280/736 X |

OTHER PUBLICATIONS

"Gelman Guide to Ultrafine Process Filtration", The Gelman Instrument Company GEL-3708, Mar. 1970, 12 pp.

Primary Examiner—Karin L. Tyson
Attorney, Agent, or Firm—Tarolli, Sundheim & Covell

[57] ABSTRACT

An apparatus for inflating a vehicle occupant restraint such as an air bag comprises a source of gas for inflating the air bag. A filter is disposed outward of the gas source and has an outer surface. A pressure controlling member is spaced outward of the filter an encircles the gas source and the filter. A helical strand is interposed between the filter and the pressure controlling member to create a plenum between them. Gas supplied by the gas source accumulates in the gap until it builds up enough pressure to burst the pressure controlling member. The strand has a smooth cylindrical outer surface. Thus, any contact between the strand and the foil layer is line contact.

10 Claims, 4 Drawing Sheets

AIR BAG INFLATOR HAVING HELICAL GAS FLOOR SPACE

BACKGROUND OF THE INVENTION

1. Technical Field

The present invention relates to an apparatus for inflating an air bag to restrain movement of a vehicle occupant during a collision.

2. Description of the Prior Art

U.S. Pat. No. 4,846,368 discloses an inflator for inflating an air bag to restrain movement of a vehicle occupant during a collision. The inflator includes a quantity of combustible gas generating material contained in a perforated tube. A cylindrical filter is wrapped around the perforated tube. A cylindrical housing extends around and encloses the gas generating material, the perforated tube, and the filter. The housing has openings in its cylindrical wall which direct gas generated by the inflator into the air bag.

In the inflator of U.S. Pat. No. 4,846,368, the pressure of the gas generated in the inflator builds up to a predetermined pressure before the gas is directed into the air bag. This is achieved by a pressure controlling layer of foil disposed on the inner surface of the cylindrical housing. The layer of foil encircles the filter and the gas generating material. Portions of the layer of foil initially block the flow of gas outwardly through the openings in the cylindrical housing. When the pressure of the gas inside the housing builds up to a predetermined pressure, the portions of the foil layer burst to release the gas. A plenum screen is wrapped around the cylindrical outer surface of the filter, radially inward of the layer of foil. The plenum screen creates an annular plenum in which gas generated by burning of the gas generating material can accumulate until the pressure builds up enough to burst the layer of foil.

The plenum screen in the inflator of U.S. Pat. No. 4,846,368 is a layer of mesh screen. The screen has a plurality of wires extending in a first direction interwoven with a plurality of wires extending in a second direction transverse to the first direction. Because the wires are interwoven, the plenum screen does not present a smooth outer surface to the layer of foil. Rather, at the locations where the wires overlap and engage the layer of foil, stress concentrations can occur.

SUMMARY OF THE INVENTION

The present invention is an apparatus for inflating a vehicle occupant restraint such as an air bag. The apparatus comprises a source of gas to inflate the air bag. A filter is disposed outward of the gas source and has an outer surface. A pressure controlling member is spaced outward of the filter. A plenum member is interposed between the filter and the pressure controlling member to create a plenum between them. The plenum member is a strand which extends in a helix around the outer surface of the filter to form a plurality of spaced apart circumferentially extending turns. Gas from the gas source accumulates in the plenum until it builds up enough pressure to burst the pressure controlling member.

In a preferred embodiment of the invention, the strand comprises a single continuous piece of wire having a substantially uniform diameter along its entire length. The pressure controlling member is an imperforate layer of foil encircling the filter and the gas generating material. The strand has a smooth outer surface. Thus, any contact between the strand and the foil layer is line contact. This minimizes stress concentrations in the foil layer.

BRIEF DESCRIPTION OF THE DRAWINGS

The foregoing and other features of the present invention will become apparent to one of ordinary skill in the art from reading the following description of a preferred embodiment of the invention with reference to the accompanying drawings, wherein.

DESCRIPTION OF A PREFERRED EMBODIMENT OF THE INVENTION

The present invention relates to an inflator for providing gas to inflate an air bag to protect an occupant of a vehicle during sudden vehicle deceleration such as occurs when the vehicle is involved in a collision. The present invention is applicable to various inflator constructions, including inflators of different shapes and sizes and inflators with different modes of operation. For example, the invention can be applied to inflators which generate gas by ignition of combustible gas generating material. The invention can also be applied to inflators that incorporate a quantity of stored gas which is heated and/or supplemented by a combustible material.

Figure 1:
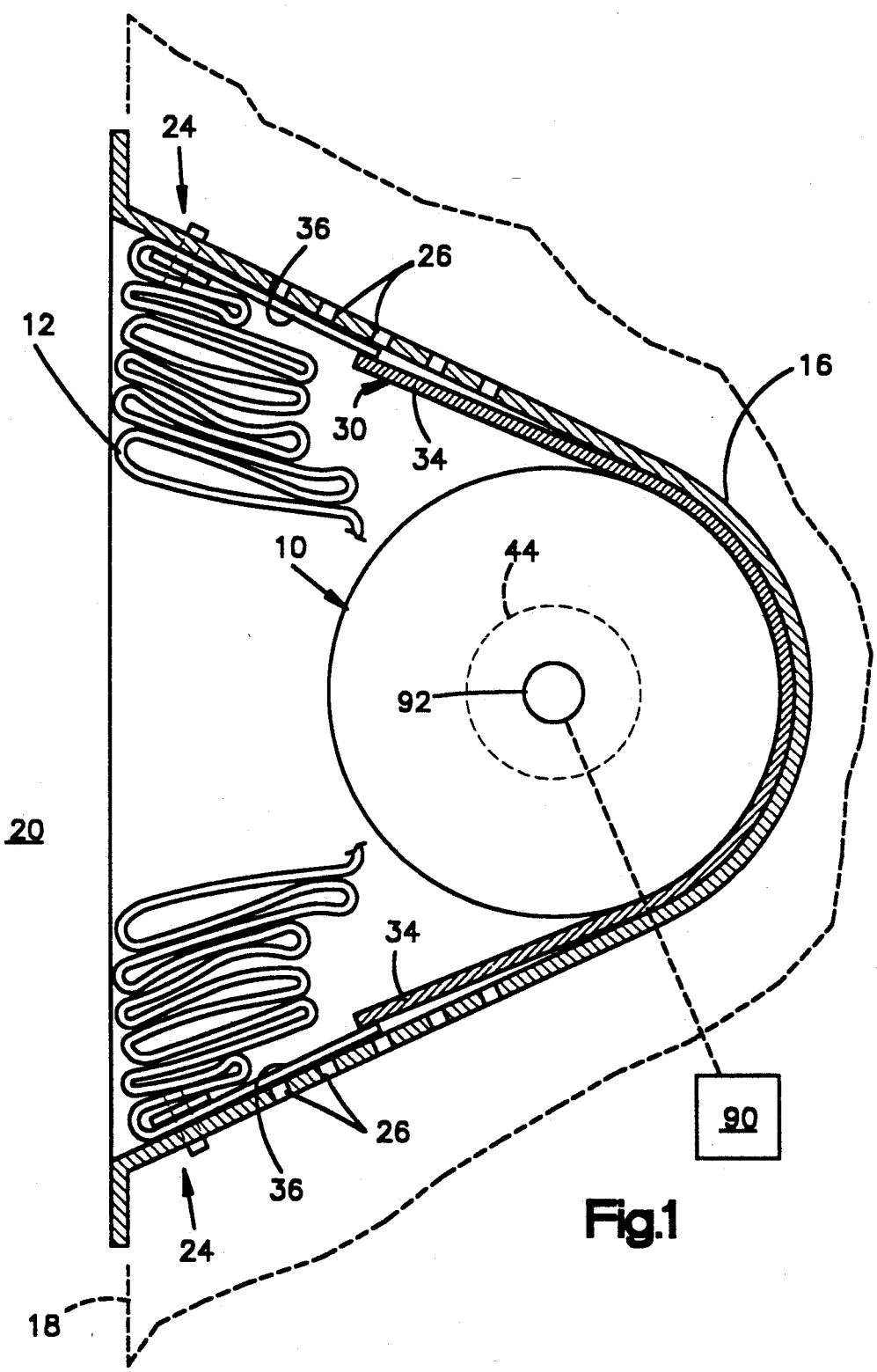
FIG. 1 is a schematic partial sectional view of a vehicle occupant safety apparatus including an inflatable air bag and an inflator constructed in accordance with the present invention.

As representative of the present invention, FIG. 1 illustrates an inflator 10 for inflating an air bag 12. The inflator 10 is generally of the type disclosed in the aforementioned U.S. Pat. No. 4,846,368. The inflator 10 and the air bag 12 are housed in a reaction canister 16 which is mounted in the instrument panel 18 of a vehicle. When the vehicle experiences sudden deceleration such as occurs in a collision, the air bag 12 is moved by a rapid flow of gas from the inflator 10 from a folded condition shown in FIG. 1 to an inflated condition shown in FIG. 2. When the air bag 12 is in the inflated condition, it extends rearward, relative to the vehicle, from the reaction canister 16 into the vehicle occupant compartment 20 to restrain forward movement of a vehicle occupant toward the instrument panel 18.

The air bag 12 is connected to the reaction canister 16 by clamping assemblies 24. The reaction canister 16 has a plurality of ambient air flow openings 26 located between the inflator 10 and the air bag 12. A sheet of material 30 includes a pair of flaps 34 extending rearward from the inflator 10 over several of the ambient air flow openings 26. Edge portions of the air bag 12 form additional flaps 36 which extend forward from the clamping assemblies 24 over the remainder of the ambient air flow openings 26.

Figure 3:
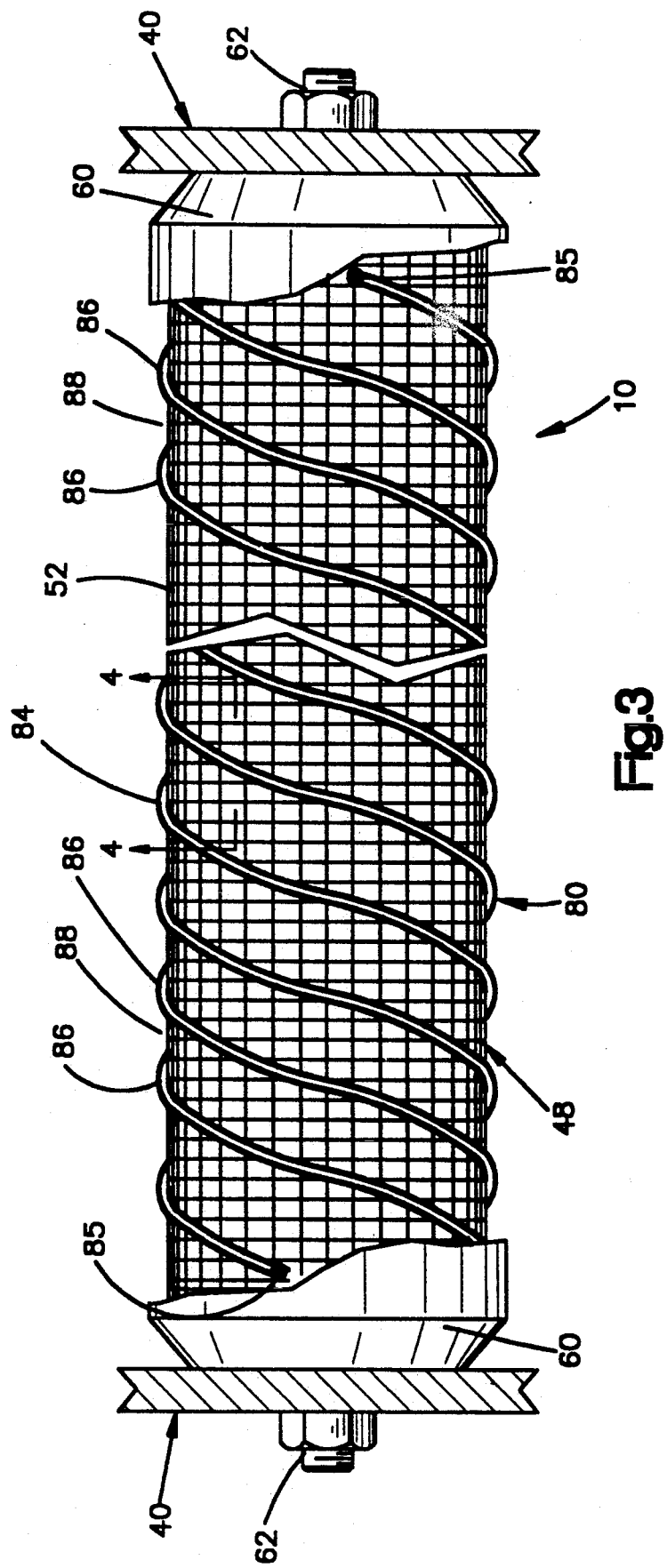
FIG. 3 is a schematic view of the inflator of FIG. 1 with parts removed.
Figure 4:
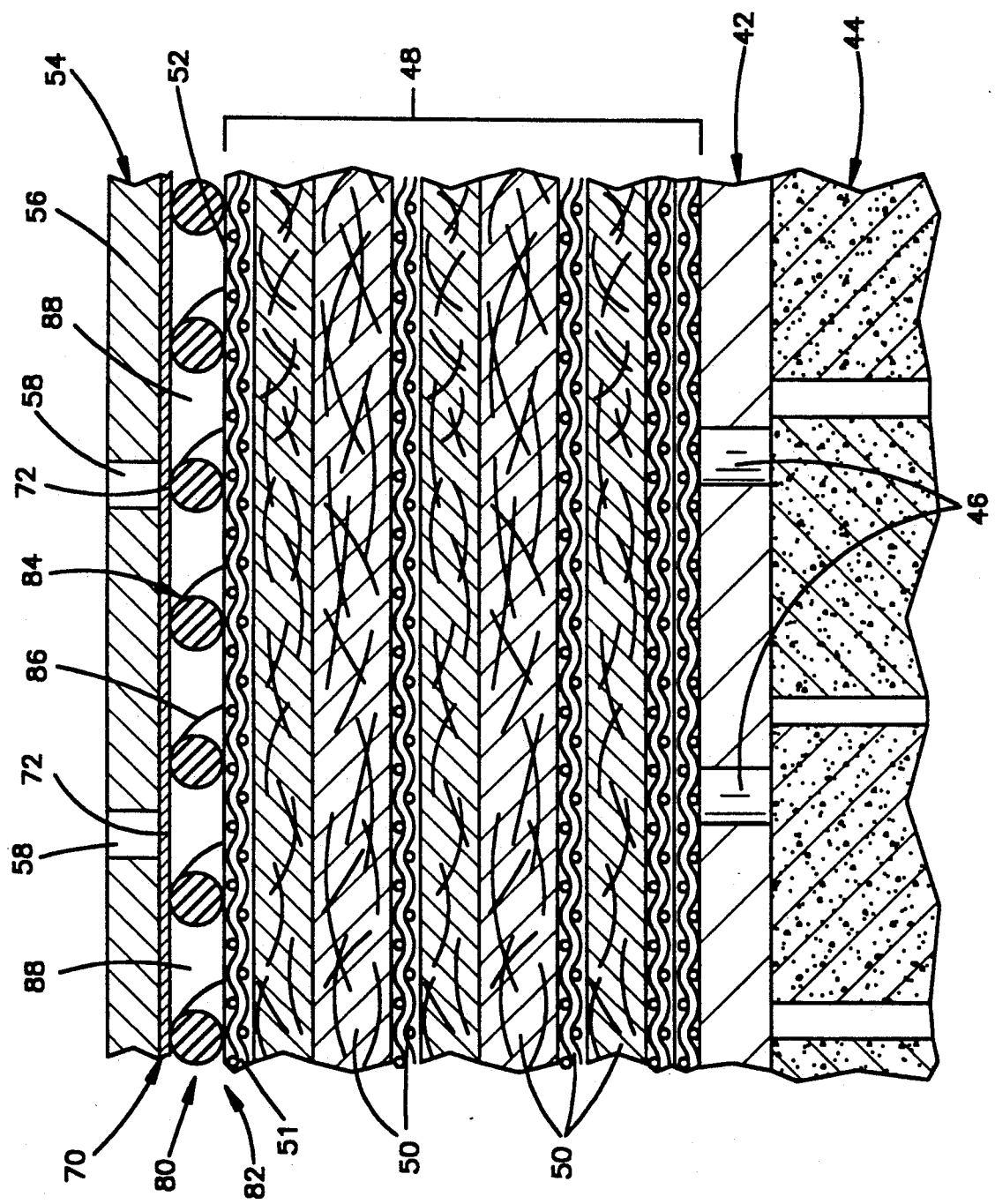
FIG. 4 is a sectional view taken along line 4—4 of FIG. 3.

The inflator 10 (FIGS. 3 and 4) has an elongate cylindrical shape and is mounted between a pair of side walls 40 of the reaction canister 16. The inflator 10 includes an axially extending perforated tube 42. A source of gas, which in the preferred embodiment is any known ignitable gas generating material 44, is contained within the perforated tube 42. A plurality of gas flow openings 46 are spaced apart along the length and circumference of the perforated tube 42

A cylindrical filter 48 is disposed radially outward of the perforated tube. The filter includes a series of filter layers 50 which are assembled into an overlying relationship and then wound around the perforated tube 42. The filter 48 has a generally cylindrical outer surface 52 formed by an outer layer 51 of 24 mesh wire screen. The filter layers 50 may be spot-welded to keep them together in their assembled relationship.

Disposed radially outward of the filter 48 is a cylindrical housing 54. The housing 54 includes a cylindrical outer wall 56. A plurality of gas flow openings 58 extend radially through the cylindrical wall 56. End portions 60 of the housing 54 are connected by suitable fasteners 62 to the side walls 40 of the reaction canister 16.

A pressure controlling member 70, which in the preferred embodiment is a layer of metal foil, is disposed on the radially inner surface of the cylindrical wall 56 of the housing 54. The foil layer 70 has portions 72 which cover the gas flow openings 58 in the wall 56 of the housing 54. The foil layer 70 encircles the filter 48 and the gas generating material 44 and cooperates with the end portions 60 of the housing to seal the filter and the gas generating material in the housing 54.

A plenum member 80 is disposed radially between the foil layer 70 and the outer surface 52 of the filter 48. The plenum member 80 forms an annular plenum 82 between the outer surface 52 of the filter 48 and the foil layer 70. In the preferred embodiment, the plenum member 80 is a single strand of wire 84 which is wrapped around the outer surface 52 of the filter 48. The ends 85 of the strand 84 are welded to the outer surface 52 of the filter 48. The strand 84 is wrapped in a helix to form a plurality of circumferentially extending turns 86 which are spaced apart axially along the longitudinal extent of the filter 48. The spaced apart turns 86 define a helically-shaped gap 88 which extends around the inflator 10 from one end of the inflator 10 to the other. The gap 88 permits gas to move radially outwardly from the outer surface 52 of the filter 48.

The strand 84, in the preferred embodiment, is a metal wire having a diameter of from 0.7 mm to 1.5 mm and preferably about 1.2 mm. Made from low carbon steel or stainless steel, the strand 84 preferably has an ultimate tensile strength of 100,000 to 280,000 psi. The circumferentially extending turns 86 of the strand 84 are spaced apart axially approximately one-sixteenth inch (1.6 mm) to about one quarter of an inch (6.4 mm) and preferably about one-eighth inch (3.2 mm). The tension in the strand 84 when it is wrapped around the outer surface 52 of the filter 48 is preferably low enough so that the strand 84 is not embedded in the outer surface 52 of the filter 48. The strand 84 may be wrapped with a force of 10 to 80 pounds, preferably about 15 pounds.

When the vehicle in which the inflator 10 is mounted experiences sudden deceleration such as occurs in a collision, a collision sensor 90 (FIGS. 1 and 2) completes a circuit to send a signal to an igniter 92 which ignites the gas generating material 44. The gas generating material 44 generates gas which flows rapidly outwardly through the gas flow openings 46 in the perforated tube 42 and into the filter 48. Unwanted products of combustion, such as hot particles, are removed from the gas as the gas flows through the filter 48 and into the plenum 82.

The pressure controlling foil layer 70 initially blocks movement of gas radially outwardly through the gas flow openings 58 in the housing 54. The gas accumulates within the plenum 82 until the pressure inside the housing 54 builds up to a predetermined pressure. When it reaches the predetermined pressure, the gas bursts the foil layer portions 72 at the openings 58 in the housing wall 56. The gas then flows radially outwardly through the openings 58 in the housing wall 56 toward the air bag 12.

Figure 2:
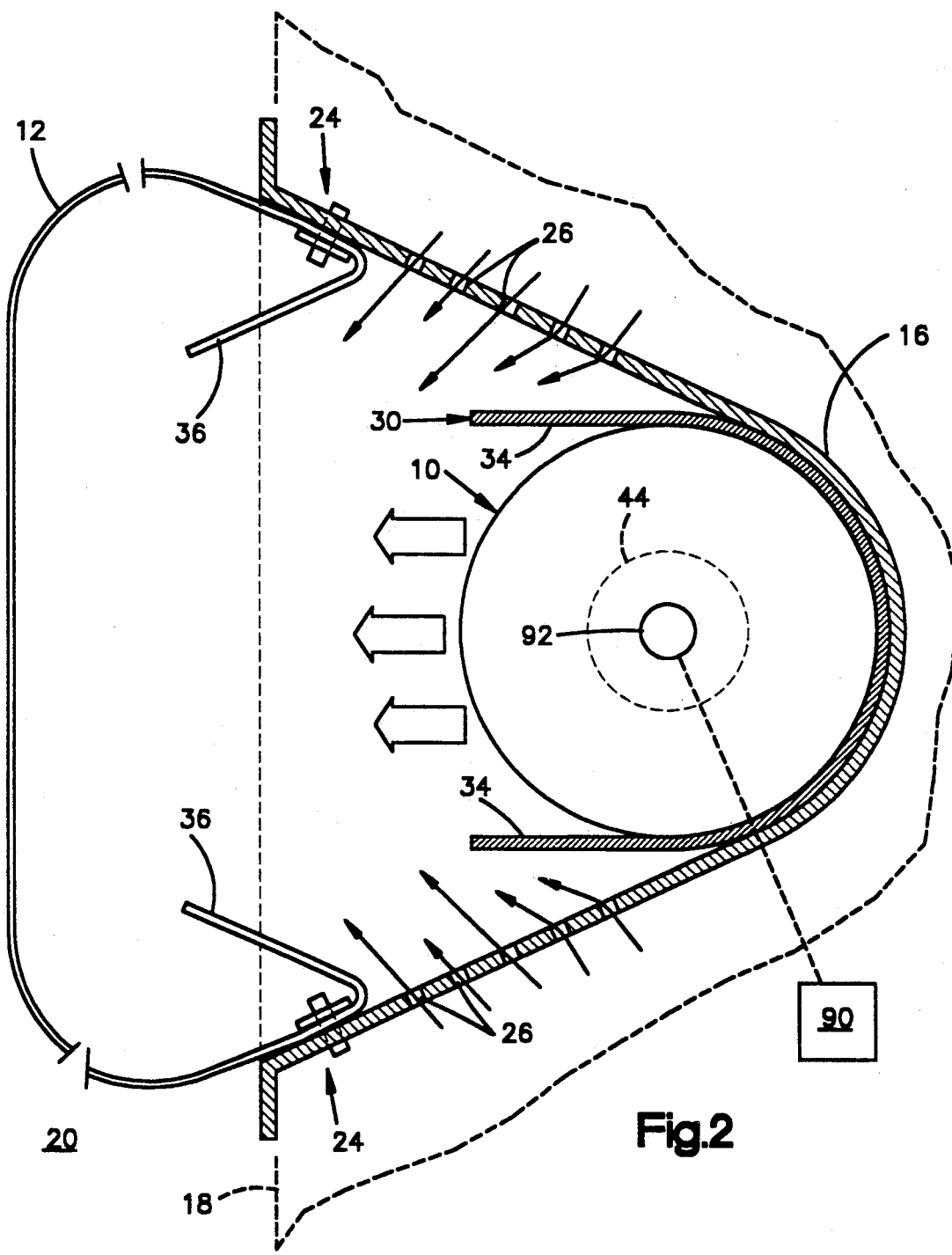
FIG. 2 is a view of the apparatus of FIG. 1 illustrating inflation of the air bag

The flow of gas from the inflator 10 toward the air bag 12, as indicated by the large arrows in FIG. 2, causes a reduction in pressure inside the reaction canister 16 adjacent to the flaps 34 and 36. The reduction in pressure inside the reaction canister 16 causes ambient air outside the reaction canister 16 to flow inwardly through the ambient air openings 26 and past the flaps 34 and 36, as indicated by the small arrows in FIG. 2. The ambient air mixes with the gas in the reaction canister 16, and cools the gas. The ambient air also augments the flow of gas into the air bag 12, and thus reduces the amount of gas which must be generated by the gas generating material 44.

The strand 84 which forms the plenum member 80 has a smooth cylindrical outer surface. Thus, any contact between the strand 84 and the foil layer 70 is line contact. Further, the strand 84 has a uniform diameter (thickness) along its entire length. The thickness of the strand is substantially equal to the radial distance between the outer surface 52 of the filter 48 and the foil layer 70.

It should be understood that design and manufacturing tolerances may result in a radial gap between the strand 84 and the foil layer 70, to enable the strand 84, filter 48 and tube 42 to be pre-assembled and then inserted axially into the housing 54. In such a case, the plenum member 80 may be spaced radially from the foil layer 70 at some locations. Nonetheless, the plenum member 80 would still present a smooth surface to the foil layer 70.

It is contemplated that a plenum member other than the strand 84 may be used. For example, a strand having a rectangular cross-section rather than a circular cross-section could be used in place of the strand 84. Also, a plenum member other than a strand may be used, for example a plenum member having intersecting portions defining gaps between them, in the form of a honeycomb or lattice. Any such other type of plenum member should, in accordance with the present invention, present a smooth surface to the foil layer 70. The plenum member may also desirably have a uniform radial thickness along its entire extent and may also be substantially the same radial thickness as the radial distance between the outer surface 52 of the filter 48 and the foil layer 70.

It should further be understood that the present invention can be applied to inflators other than the inflator 10 illustrated in the drawings. For example, the present invention can be applied to inflators in which gas for inflating an air bag flows in a direction other than radially.

From the above description of the invention, those skilled in the art will perceive improvements, changes and modifications in the invention. Such improvements, changes and modifications within the skill of the art are intended to be covered by the appended claims.

We claim:

1. Apparatus for inflating a vehicle occupant restraint such as an air bag, said apparatus comprising:

a source of gas for inflating the vehicle occupant restraint;

a filter disposed outward of said source of gas and having an outer surface;

a pressure controlling member spaced outward of said filter; and means for defining a plenum between said filter and said pressure controlling member, said plenum comprising a gas flow space through which gas from said source of gas can flow outward from said filter toward said pressure controlling member, said means including a plenum member having helical turns extending circumferentially entirely around said outer surface of said filter, a plurality of said helical turns being spaced from each other to define said gas flow space in a helical shape between said plurality of helical turns, said gas flow space having a continuous width extending axially between adjacent ones of said plurality of helical turns and having a continuous length extending circumferentially entirely around said outer surface of said filter a plurality of times with said plurality of helical turns;

said gas flow space being continuously open and free of obstructions between said plurality of helical turns through said width and length of said gas flow space to permit said gas to flow outward from said outer surface of said filter and radially through said gas flow space toward said pressure controlling member entirely across said width and entirely along said length of said gas flow space;

said plenum member being a strand consisting of a single continuous piece of wire wrapped around said outer surface of said filter, said strand having a substantially uniform diameter along its length and a substantially uniform thickness along its entire length, said thickness being substantially equal to the distance between said filter and said pressure controlling member.

2. Apparatus as defined in claim 1 wherein said pressure controlling member encircles said filter and said source of gas.

3. Apparatus as defined in claim 2 wherein said filter has a cylindrical outer surface, said apparatus further comprising a housing disposed outward of said filter, said housing comprising a cylindrical wall having inner and outer surfaces and means for defining a plurality of openings extending through said wall between said inner and outer surfaces.

4. Apparatus as defined in claim 3 wherein said pressure controlling member comprises an imperforate layer of foil disposed adjacent said inner surface of said cylindrical wall and having portions blocking said plurality of openings in said wall.

5. Apparatus comprising:

an inflatable vehicle occupant restraint;

a source of gas for inflating said vehicle occupant restraint;

a tubular cylindrical filter extending circumferentially around said source of gas;

a cylindrical wall member extending circumferentially around said filter, said wall member having gas flow openings for directing gas from said source of gas toward said vehicle occupant restraint;

a pressure controlling member located radially between said filter and said wall member, said pressure controlling member extending across said gas flow openings in said wall member; and plenum means for defining a plenum between said filter and said pressure controlling member, said plenum comprising a gas flow space through which gas from said source of gas can flow outward from said filter toward said pressure controlling member, said plenum means having helical turns extending circumferentially entirely around said filter, a plurality of said helical turns being spaced from each other to define said gas flow space in a helical shape between said plurality of helical turns, said helically shaped gas flow space having a width extending axially between adjacent ones of said plurality of helical turns and having a length extending circumferentially entirely around said filter a plurality of times with said plurality of helical turns;

said helically shaped gas flow space being continuously open and free of obstructions between said plurality of helical turns throughout said width and length of said helically shaped gas flow space to permit said gas to flow outward from said filter and radially through said helically shaped gas flow space toward said pressure controlling member entirely across said width and entirely along said length of said helically shaped gas flow space;

said plenum means including a strand having helical turns extending circumferentially around said filter, said strand having a substantially uniform thickness extending along the length of said helical turns in said strand, said thickness being substantially equal to the distance between said filter and said pressure controlling member.

6. Apparatus as defined in claim 5 wherein said strand is disposed in helical line contact with said pressure controlling member, said helical line contact being coextensive with said length of said helical turns in said strand.

7. Apparatus as defined in claim 6 wherein said helical line contact is the only contact of said plenum means with said pressure controlling member radially between said filter and said pressure controlling member.

8. Apparatus comprising:

an inflatable vehicle occupant restraint;

a source of gas for inflating said vehicle occupant restraint;

a cylindrical wall member extending circumferentially around said source of gas, said wall member having gas flow openings for directing gas from said source of gas toward said vehicle occupant restraint;

a rupturable pressure controlling member extending circumferentially around the inside of said cylindrical wall member and across said gas flow openings;

filter means for filtering gas between said source of gas and said pressure controlling member, said filter means including a plurality of cylindrical layers of mesh filter screen extending around said source of gas between said source of gas and said pressure controlling member, one of said layers of mesh filter screen being closer to said pressure controlling member than any other layer of mesh filter screen between said source of gas and said pressure controlling member; and plenum means for defining a plenum between said filter means and said pressure controlling member, said plenum means having a plurality of helical turns extending circumferentially entirely around said one of said mesh filter screens, said helical turns defining a gap extending around said one of said mesh filter screens in a helical shape between said helical turns, said gap defining a gas flow space through which gas can flow radially outward from said one of said mesh filter screens toward said pressure controlling member;

said plenum means including a strand having helical turns extending circumferentially around said one of said mesh filter screens, said strand having a substantially uniform thickness extending along the length of said helical turns in said strand, said thickness being substantially equal to the distance between said filter means and said pressure controlling member.

9. Apparatus as defined in claim 8 wherein said strand is disposed in helical line contact with said pressure controlling member, said helical line contact being coextensive with a plurality of said helical turns.

10. Apparatus as defined in claim 9 wherein said helical line contact is the only contact of said strand with said pressure controlling member radially between said filter means and said pressure controlling member.

* * * * *